United States Patent [19]
Sherman

[11] Patent Number: 5,432,928
[45] Date of Patent: Jul. 11, 1995

[54] UPDATING OBJECTS STORED IN A PERMANENT CONTAINER WHILE PRESERVING LOGICAL CONTIGUITY

[75] Inventor: Andrew G. Sherman, Redmond, Wash.

[73] Assignee: Microsoft Corporation, Redmond, Wash.

[21] Appl. No.: 974,146

[22] Filed: Nov. 10, 1992

[51] Int. Cl.⁶ .................................... G06F 17/30
[52] U.S. Cl. .................... 395/600; 395/425; 395/934; 364/419.07; 364/222.82; 364/962.1; 364/DIG. 1; 364/DIG. 2
[58] Field of Search .......... 395/400, 800, 600, 425, 395/650; 364/200, 419.07

[56] References Cited

U.S. PATENT DOCUMENTS

| | | | |
|---|---|---|---|
| 2,840,304 | 6/1958 | Willims et al. | 364/200 |
| 2,945,213 | 7/1960 | Lubkin | 364/200 |
| 4,660,130 | 4/1987 | Bartley et al. | 395/400 |
| 4,771,375 | 9/1988 | Beglin et al. | 395/425 |
| 5,129,084 | 7/1992 | Kelley, Jr. et al. | 395/650 |
| 5,136,706 | 8/1992 | Courts | 395/600 |
| 5,287,496 | 2/1994 | Chen et al. | 395/600 |

*Primary Examiner*—Thomas G. Black
*Assistant Examiner*—Paul R. Lintz
*Attorney, Agent, or Firm*—Seed and Berry

[57] ABSTRACT

A computer system and method for updating an object stored in a container. A container stored on a storage device includes a plurality of objects being ordered from a first object to a last object. One of the objects in the container is selected for updating and is read from the container into a computer memory where it is edited. Next, each of the objects ordered in the container after the selected object is moved to a new location within the container so that the selected object is overwritten. The container is then truncated after the last moved object. The edited selected object is then written from the memory and appended to the container.

16 Claims, 12 Drawing Sheets

UPDATING OBJECTS STORED IN A PERMANENT CONTAINER WHILE PRESERVING LOGICAL CONTIGUITY

TECHNICAL FIELD

This invention relates generally to a computer method and system for updating data, and more specifically, to a computer method and system for updating an object in a container that includes multiple objects.

BACKGROUND OF THE INVENTION

Computer systems provide for the permanent storage of data that is organized into files on a storage device. In object-oriented parlance, data that is logically related is referred to as an object. Also, a file that contains an object is referred to as a container. When an object is stored in a container, the data of the object is typically stored in a logically contiguous portion of the container. A file system used to manage the storage of containers on the storage device may actually store the data in a container in non-contiguous portions of the device. FIG. 1A is a block diagram illustrating objects stored in a container. A container 102 contains ordered object A 104, object B 105, and object C 106. Object A 104 is the first object in the container, and object C 106 is the last object in the container. A memory 101 currently holds no objects.

Existing computer systems allow users to edit objects stored in containers. An example using FIGS. 1A–1D will illustrate typical prior methods for updating objects stored in the container. FIGS. 1A–1D show the contents of the memory 101 and the container 102 as object B 105 is edited and then saved in the container 102.

The prior methods first load object B 105 into the memory 101 as shown in FIG. 1B. The prior methods then edit object B 105. FIG. 1C shows the edited object B 108. In response to a user request to save the edited object B 108, the prior methods create a temporary container 109. The prior methods then write object A 104, edited object B 108, and object C 106 to the temporary container 109. The prior methods then delete the container 102 and rename temporary container 109 to the name of the deleted container 102 as shown by renamed container 110 in FIG. 1D.

For some time now, it has been appreciated that accessing permanent storage devices is much slower than accessing memory. Consequently, it would be desirable to reduce the amount of data written to storage devices. Moreover, it is also desirable to reduce the amount of storage needed to accomplish a given task.

SUMMARY OF THE INVENTION

An object of the invention is to provide a method of and system for saving edited data from a memory to a container that contains an unedited version of the data.

Another object of the invention is to provide a method of and system for saving data while using less storage space than prior systems.

These and other objects, which will be apparent as the invention is more fully described, are provided by a method of and system for updating an object in a container. In a preferred embodiment of the present invention, the object to be edited is retrieved from the container, moved to a memory, and edited. Upon a request from a user to save the edited object, all the objects stored after an end of the retrieved object are moved upward in the container so as to overwrite the retrieved object. The container is then truncated after the end of a last moved object. Finally, the edited object is moved from the memory and appended to the container.

DETAILED DESCRIPTION OF THE INVENTION

The present invention provides a computer method and system for retrieving an object from a container having multiple objects and incrementally saving an edited version of the retrieved object. Specifically, a preferred incremental save method: (1) locates the retrieved object to be saved in the container, (2) moves upward in the container all the objects stored after the retrieved object to overwrite the retrieved object, (3) truncates the container after the end of the last moved object, and (4) appends the edited version of the retrieved object to the container.

Figure 1A:
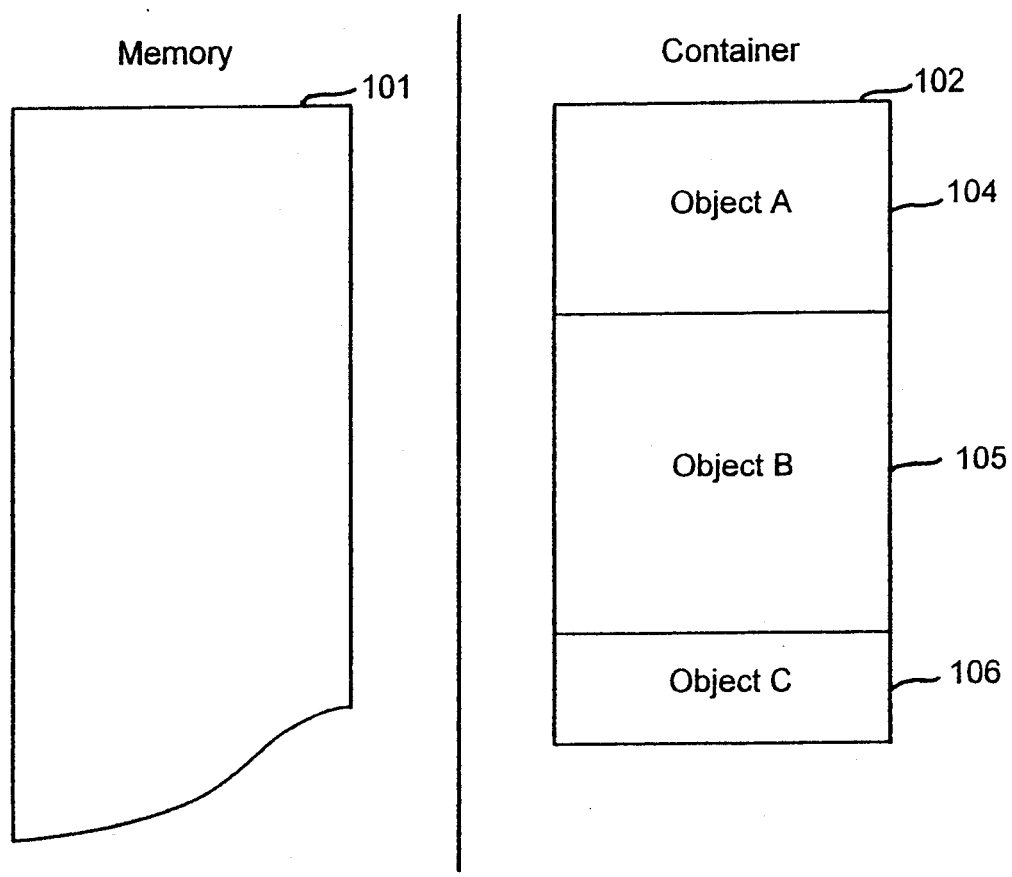
FIGS. 1A–1D are block diagrams depicting a state of a memory and a container during execution of a prior art method used to update objects stored in the container.
Figure 1B:
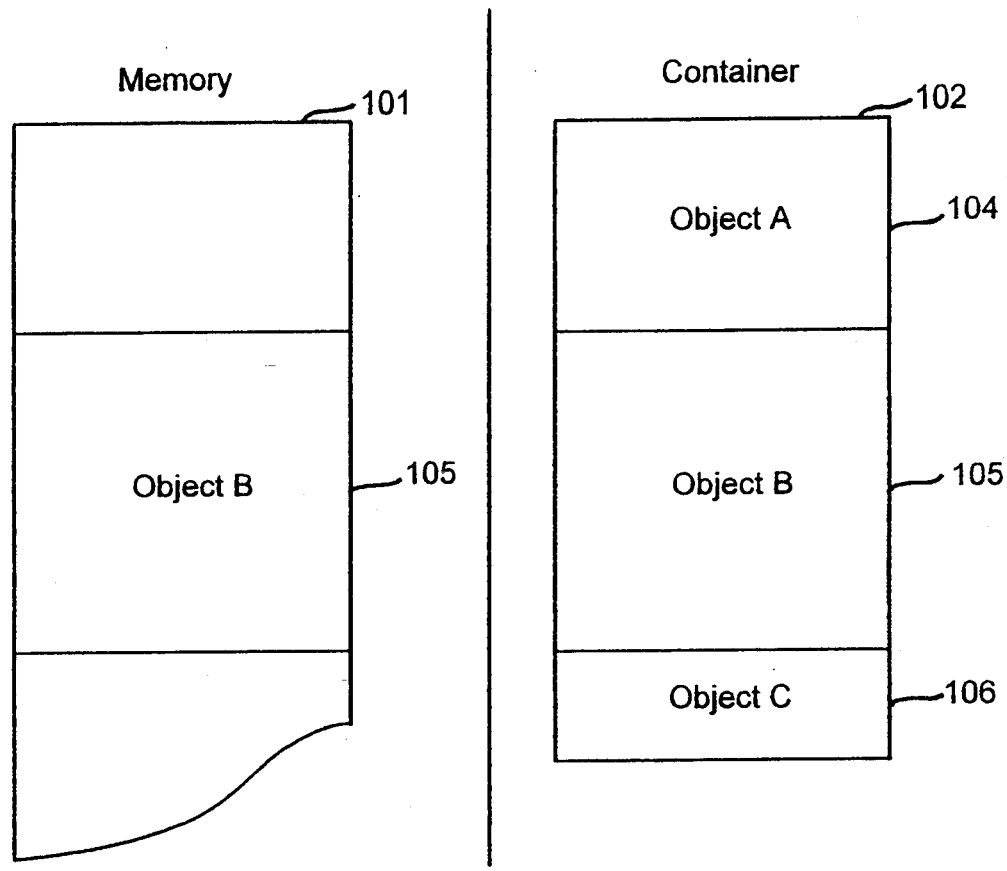
Figure 1C:
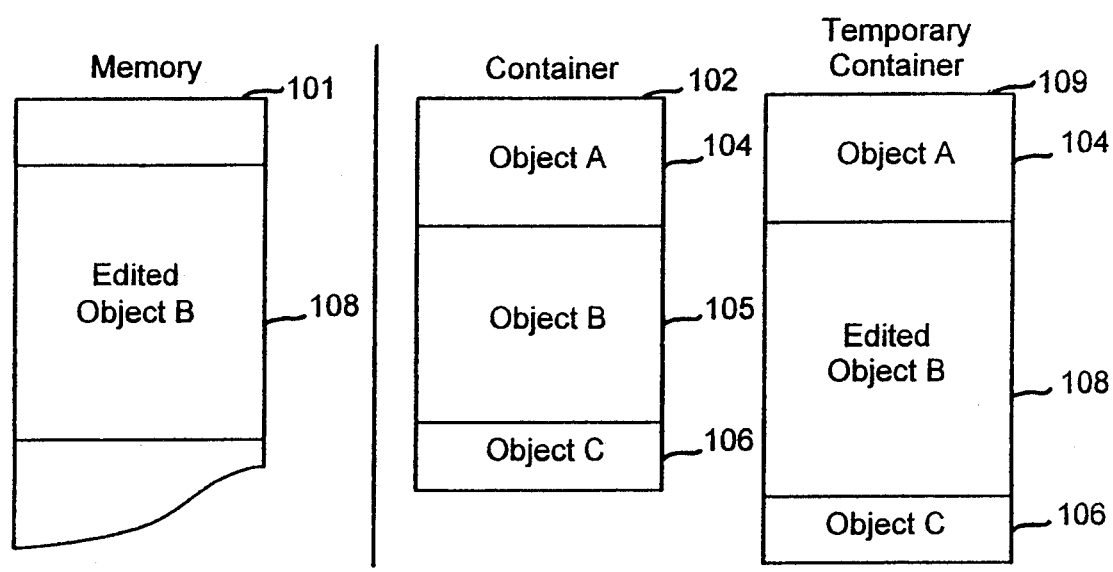
Figure 1D:
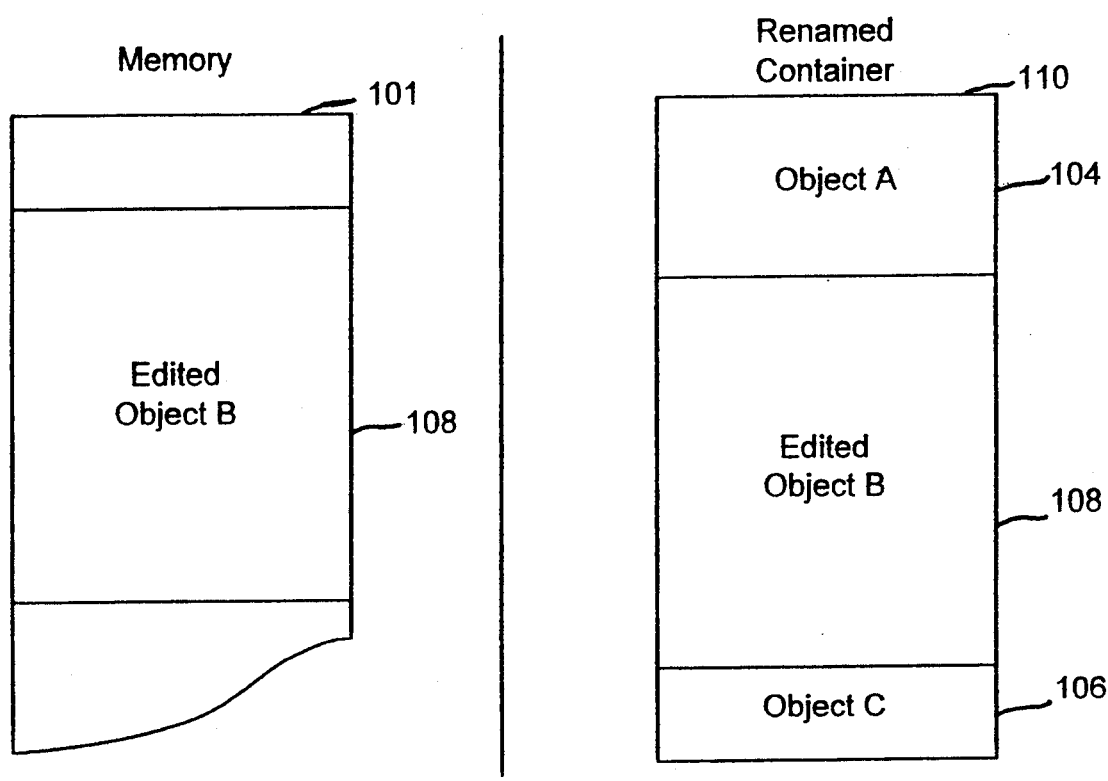
Figure 2:
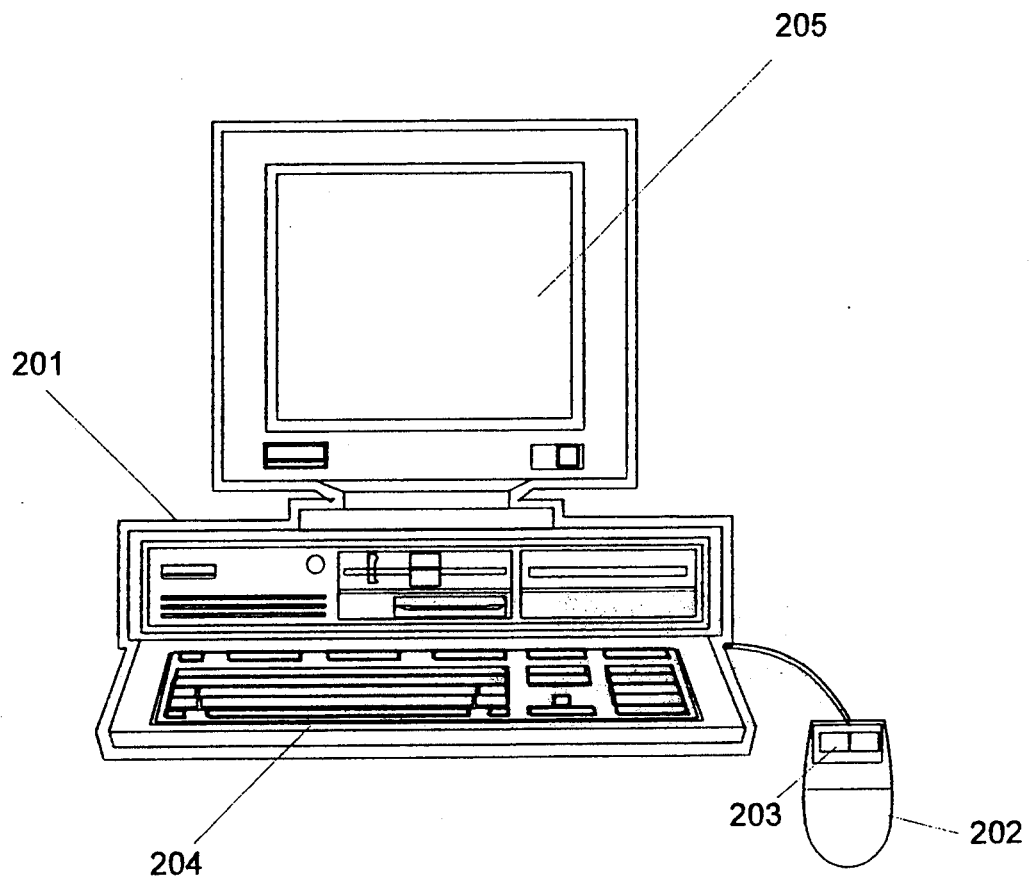
FIG. 2 is a block diagram of a data processing system which can execute procedures in accordance with a preferred embodiment of the present invention.

In a preferred embodiment, the components of the computer system depicted in FIG. 2 are used to execute program code to implement the methods of the present invention described in detail below. The computer system of FIG. 2 comprises a computer unit 1, a pointing or mouse input device 2, including a control input button 3, a keyboard 4, and a display screen 5. The computer unit 1 comprises a CPU, computer memory, and a permanent storage device. In the following, the term "storage device" refers to permanent storage devices (e.g., disk), computer memory, or other means for storing data.

A specific example shown in FIGS. 3A–3F will help illustrate a preferred method of and system for incrementally saving edited versions of retrieved objects according to the present invention. FIGS. 3A–3F are block diagrams showing the contents of the container and the memory during the incremental save.

Figure 3A:
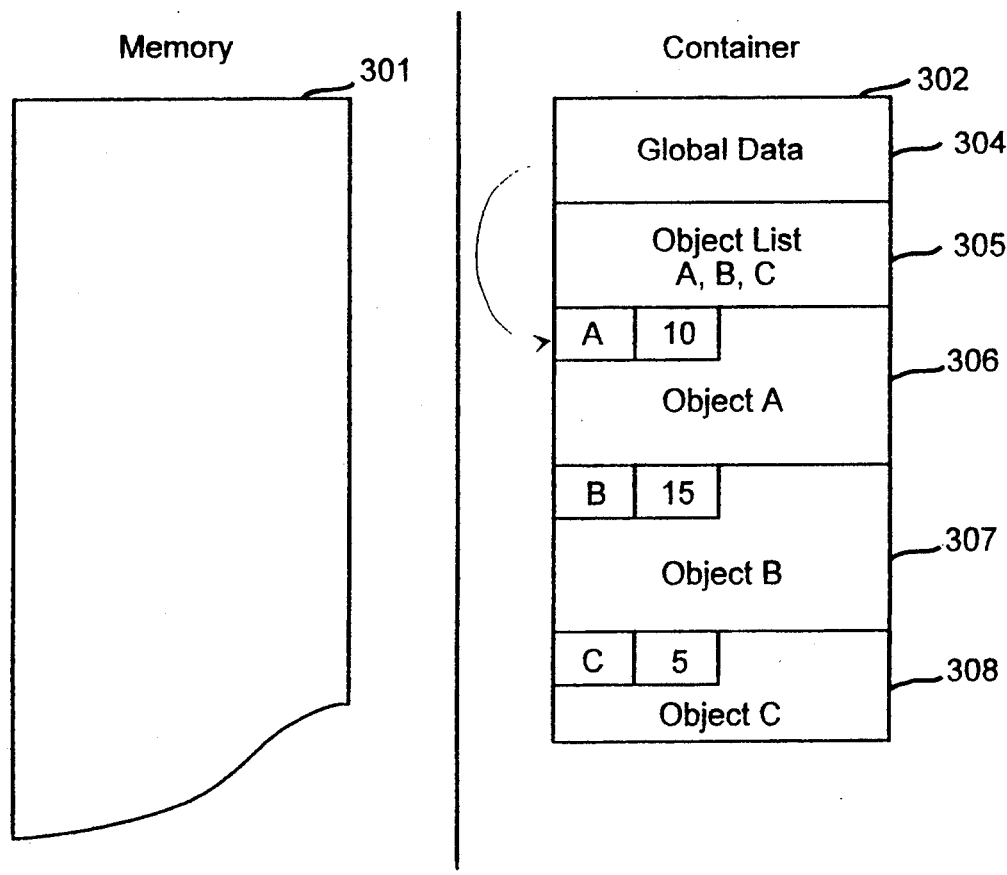
FIGS. 3A–3F are block diagrams depicting the state of the memory and the container during execution of the preferred embodiment of the present invention.

FIG. 3A is a block diagram illustrating the initial content of a container 302. The container 302 is preferably stored on a disk based storage device. The container 302 contains global data 304, an object list 305, object A 306, object B 307, and object C 308. Global data 304 contains a pointer to the first object and may also contain data relevant to all objects within the container. The object list 305 contains a list of the names of the objects within the container 302. Object A 306, object B 307, and object C 308 contain an object name, an object size, and object data. The system of the present invention uses the pointer to the first object and the object sizes to locate the objects in the container.

Figure 3B:
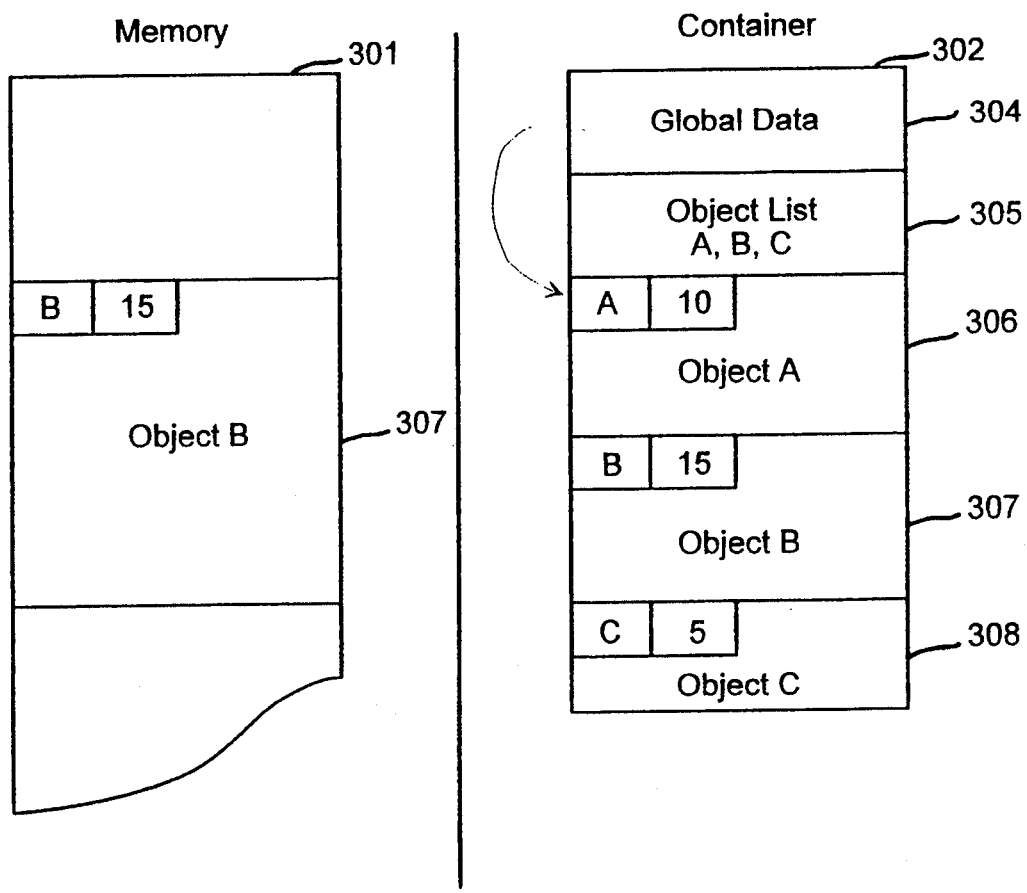

Initially, object B 307 exists only in the container 302, and the memory 301 contains no objects. When a user wants to edit object B 307, the system verifies whether object B 307 is in the container 302 by scanning the object list 305. Since object B 307 is listed in the object list 305, the system retrieves the pointer to the first object from the global data 304. The system then locates object B 307 in the following manner. The system determines whether the first object is object B 307 by comparing the name of the first object with the name of object B. If the names are the same, then object B 307 has been located. Otherwise, the system calculates the location of the next object by adding the size of the first object to the pointer to the first object and thereby produces a pointer to the second object. The system then repeats this process until object B 307 is located. When object B 307 is located, the system loads (reads) object B 307 into memory 301. FIG. 3B is a block diagram illustrating the memory 301 and the container 302 after object B 307 has been loaded into memory.

Figure 3C:
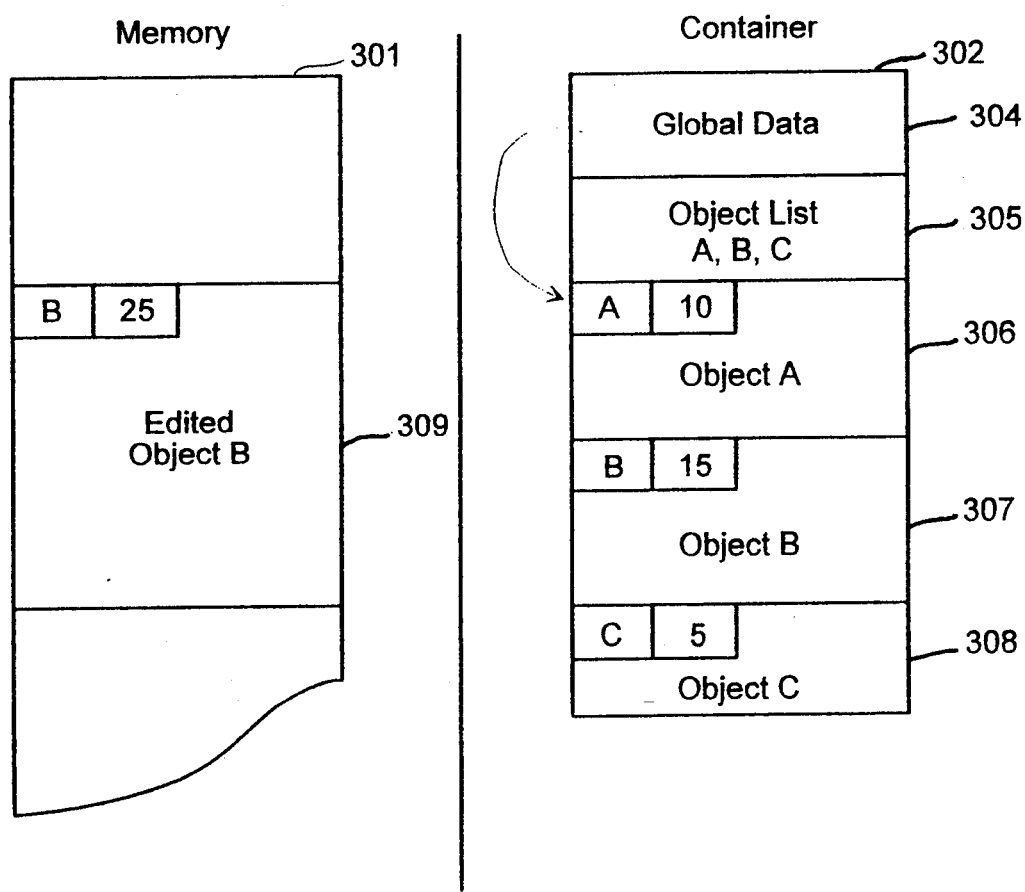

The system, according to user requests, then edits the object B 307 stored in memory 301. FIG. 3C is a block diagram illustrating edited object B 309. As shown, the size of the edited object B 309 is 25, while the size of unedited object B 307 in the container 302 is 15.

After editing the object B 307, the user requests that edited object B 309 be saved to the container 302. Since edited object B 309 is now of a different size than object B 307, in this case it is larger than unedited object B 307, edited object B 309 will not fit into a space occupied by object B 307. To save edited object B 309 to the container 302, the system moves object C 308 and any subsequent objects that may follow object C 308 from its current location to a location immediately after object A 305, thus at least partially overwriting unedited object B 307 in the container 302.

Figure 3D:
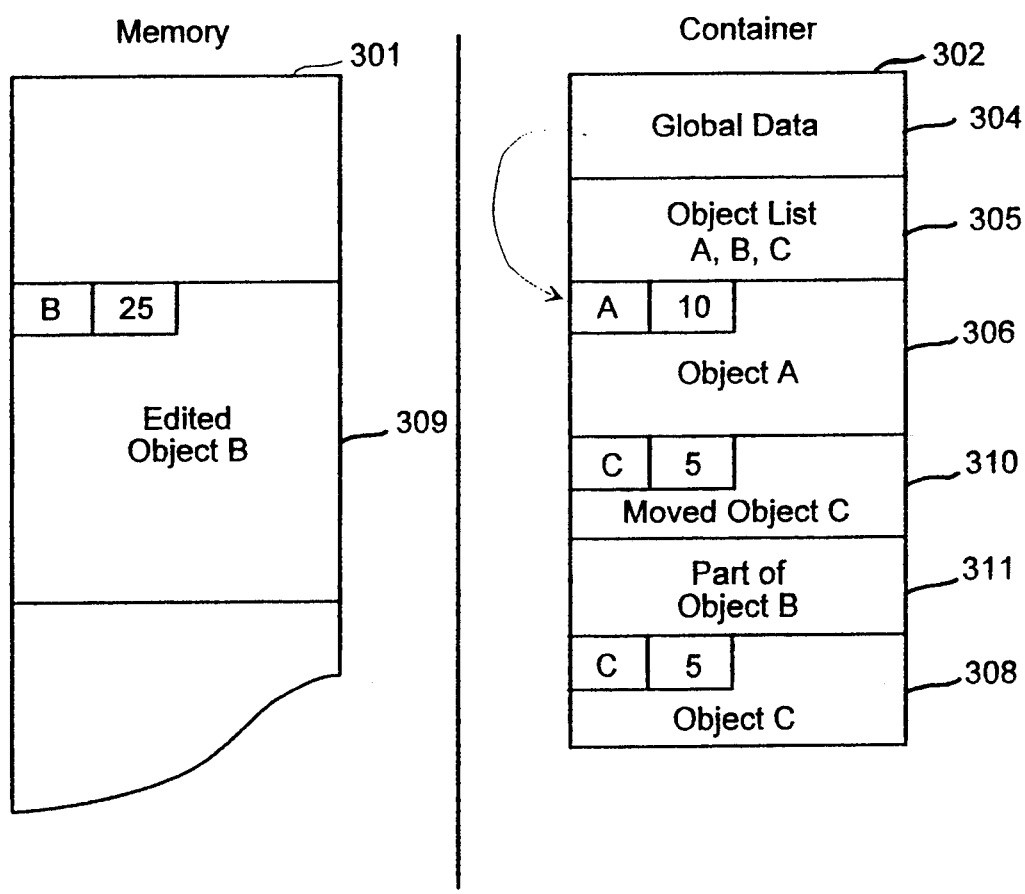
Figure 3E:
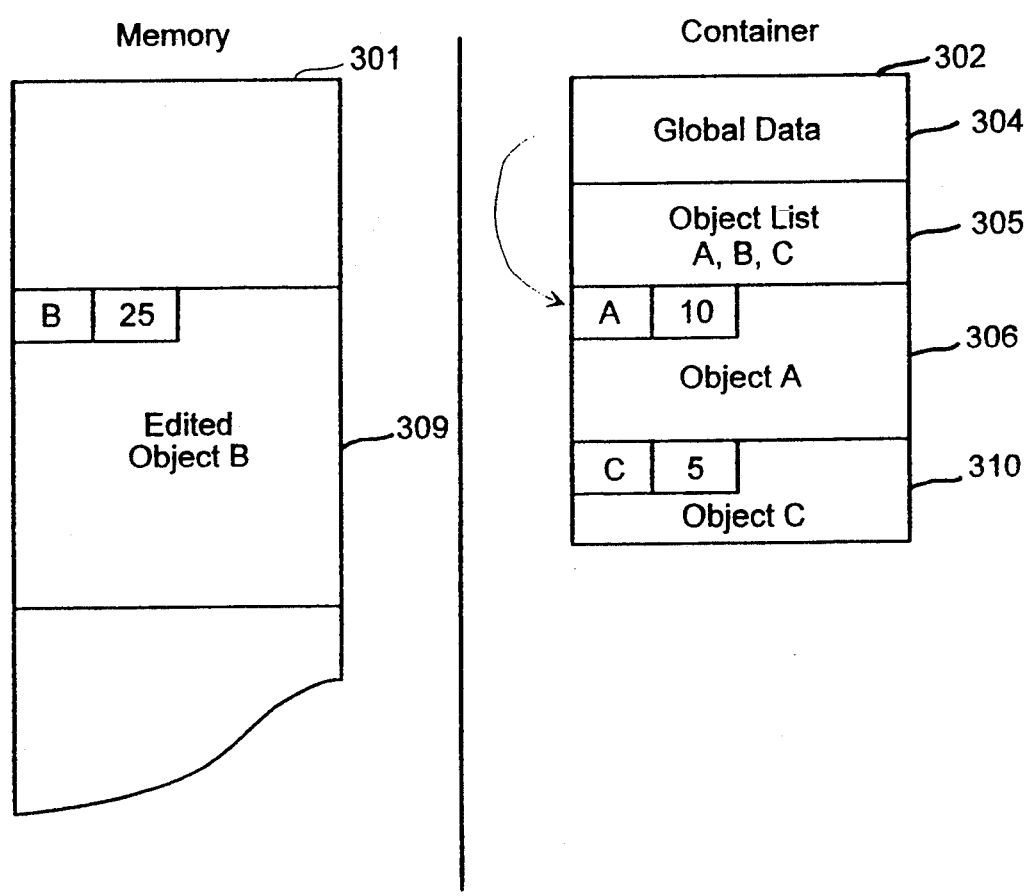

FIG. 3D is a block diagram illustrating the contents of the container 302 after object C 308 has been moved. It should be noted that in the present example, some data 311 from unedited object B 307 was not overwritten by moved object C 310 because object B 307 was larger than object C 308. It should be appreciated that object B 307 would be completely overwritten if moved object C 310 was larger than object B 307 or if the total size of the objects following object B 307 were larger than object B 307. The system then truncates the container 302 after moved object C 310. FIG. 3E is a block diagram illustrating the contents of the container 302 after truncation.

Figure 3F:
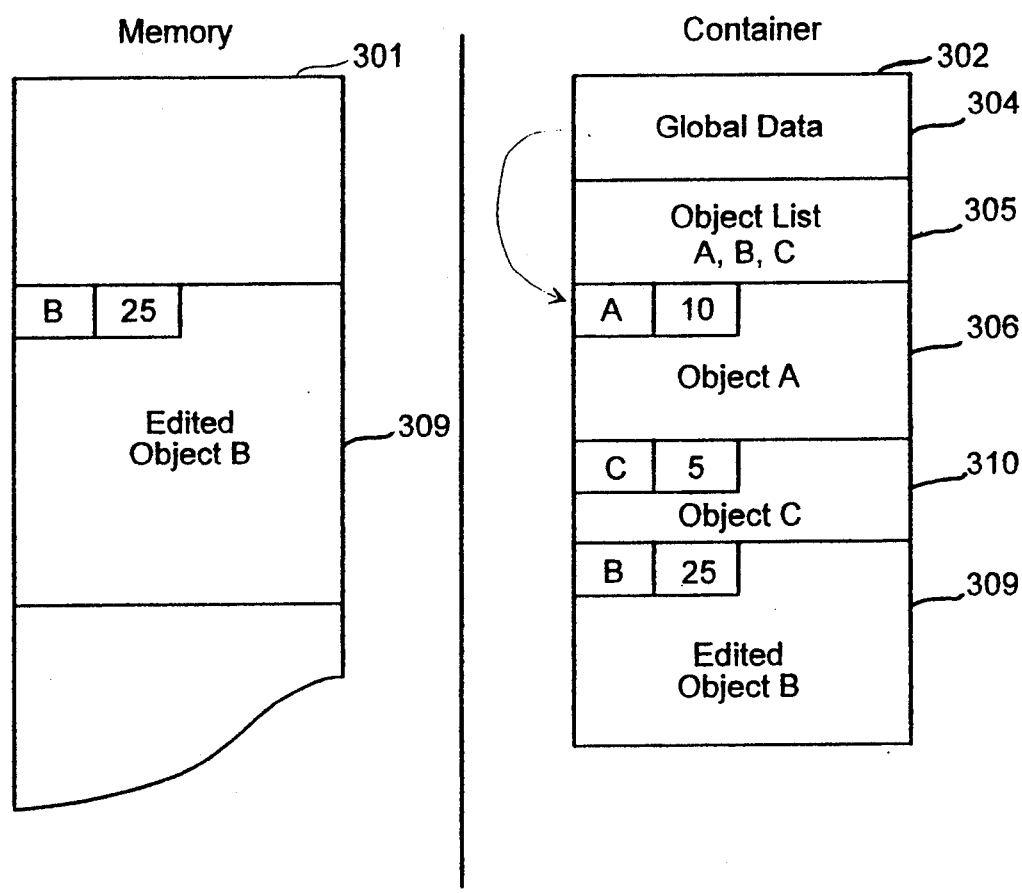

Finally, the system writes edited object B 309 from memory 301 to a position after moved object C 310 in the container 302. FIG. 3F is a block diagram illustrating the contents of the container 302 after writing edited object B 309 to the container. As shown in FIG. 3F, the global data 304 and the object list 305 are not modified. Thus, in this preferred embodiment of the invention, the order of the names in the object list does not necessarily reflect the order of the objects as they are stored in the container 302.

Figure 4:
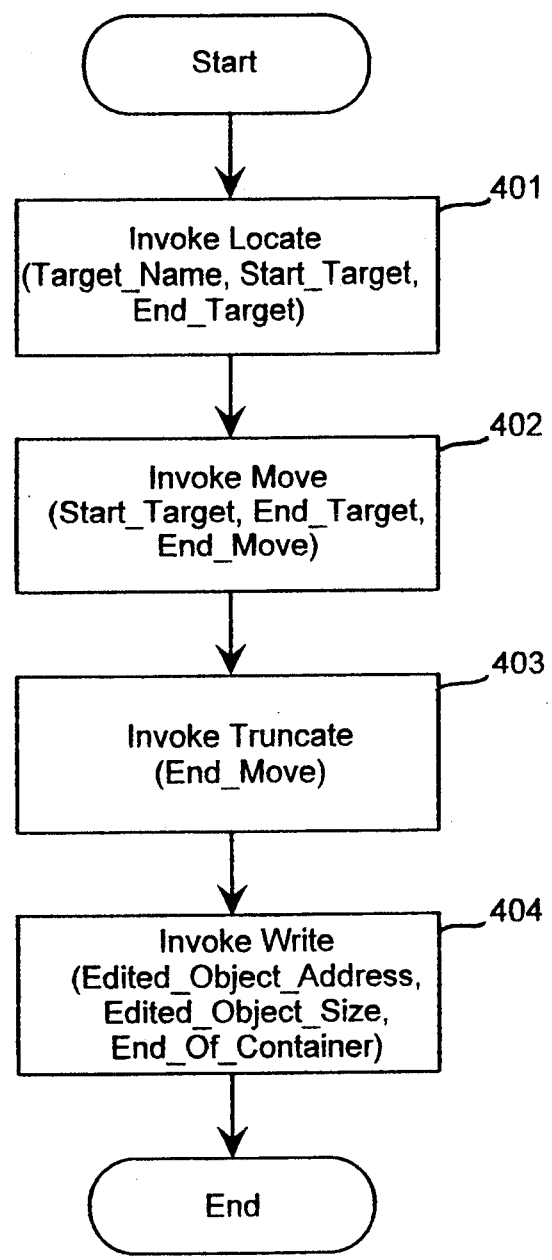
FIG. 4 is a flow diagram of the steps carried out to update objects stored in the container using the preferred embodiment of the present invention.

FIG. 4 is a flow diagram illustrating the preferred method of the present invention used by the above-described system for incrementally saving an edited object stored in a memory to a container. The method locates a target object in the container (i.e., an unedited version of the edited object), moves all objects after the ending address of the target object as a block so that the target object is overwritten, truncates the container after the last address of the moved block, and appends the edited object to the container after the ending address of the block. The method preferably is performed on a computer system under the control of an operating system. The method preferably uses operating system functions to access the container.

In step 401 of FIG. 4, the method invokes the function Locate passing it a target object name. The function searches the container until it locates the object with the target object name. The function Locate returns the starting address of the target object and an ending address of the target object. One skilled in the art would appreciate that this step would typically be performed when the unedited target object is first loaded into memory.

In step 402, the method invokes the function Move passing it the starting address of the target object and the ending address of the target object. The function Move moves the block comprising the objects with addresses after the ending address of the target object from its position in the container to a new location beginning at the starting address of the target object in the container. This results in fully or at least partially overwriting the target object. The function Move returns an ending address of the last object in the moved block.

In step 403, the method invokes the function Truncate, passing it the ending address of the last moved object. The function truncates the container after the last moved object.

In step 404, the method invokes the function Write passing it a pointer to the edited object in memory, the size of the edited object, and the end-of-container address. The function Write appends the edited object to the end of the container.

Those of ordinary skill in the art will understand that other system architectures can be used to implement the methods of the present invention described above including, but not limited to, a local area network, in which several computers are coupled with file servers to share access to data among computer users through a data communications network.

The system and method of the present invention provide advantages over existing systems and methods. For example, the present system and method requires less allocation of storage space than existing systems and methods because the edited object is written to the original container instead of to a temporary container. The present system and method also saves the edited object more quickly than existing systems and methods because the objects in the container stored above the target object do not have to be moved in order to save the edited object.

It will be appreciated that, although a specific embodiment of the invention has been described herein for purposes of illustration, various modifications may be made without departing from the spirit and scope of the invention. Accordingly, the invention is not limited except as by the appended claims.

I claim:

1. A method executed in a computer system for updating an object stored in a container, the container having a plurality of objects, the objects being ordered in the container from a first object to a last object, the computer system having a memory and a storage device, the container being stored on the storage device, the method comprising the steps of:
   selecting an object to update;
   determining a beginning address of the selected object and a size of the selected object;

with reference to the beginning address and the size of the selected object, reading the selected object from the container into the memory;

editing the selected object while the selected object is in the memory;

determining a size of the edited selected object;

determining a beginning address and an ending address of a block of objects, the block comprising objects ordered in the container following the unedited selected object;

with reference to the beginning and ending addresses of the block of objects, moving each of the objects of the block to a new location within the container while preserving the block ordering;

determining an ending address of a last one of the moved objects; and with reference to the size of the edited selected object and the ending address of the last one of the moved objects, writing the edited selected object from the memory to the container.

2. The method of claim 1 wherein the step of moving moves a first ordered object of the moved objects to a location of the unedited selected object.

3. The method of claim 2 wherein the step of moving moves the first ordered object of the moved objects to a new address beginning with a beginning address of the unedited selected object.

4. The method of claim 1, further including the step of truncating the container after a last ordered object of the moved objects has been moved to its new location, the step of truncating occurring after the moved objects have been moved to their new location and before writing the edited selected object from the memory to the container.

5. The method of claim 4 further comprising the step of determining the ending address of the moved objects, and wherein the step of writing the edited selected object from the memory to the container writes the edited selected object to a location after the new location within the container of the last ordered object of the moved objects, the step of writing occurring after the step of moving.

6. The method of claim 1 wherein the container includes an object list containing a list of the objects stored in the container, the object list being located before the first object in the container and wherein the step of selecting an object to update includes the step of searching the list to determine if the selected object is stored in the container.

7. The method of claim 1 wherein each object has a size and wherein the step of reading the selected object includes the steps of determining the beginning address of the first ordered object, and locating the selected object based on the sizes of the objects before the selected object.

8. A method executed in a computer system for saving data, the computer system having a memory and a storage device, the storage device having a file with a plurality of objects stored logically contiguously from a first address to a last address, each object containing data and having a starting address and an ending address, the method comprising the steps of:

generating in memory a revised version of a target object stored on the storage device;

determining the starting address and the ending address in the storage device of the target object;

moving each object stored logically contiguously after the ending address of the target object to a new address so as to maintain logical contiguity of the objects thus moved and to at least partially overwrite the target object;

determining an address after the last address of a last ordered one of the moved objects; and writing the revised version of the target object from the memory to the storage device starting at the address thus determined.

9. The method of claim 8 wherein each object has a size and the step of determining determines the starting address of the target object based on the sizes of the objects before the target object.

10. A computer system for updating an object stored in a container, the container having a plurality of objects, the objects being ordered in the container from a first object to a last object, the computer system having a memory and a storage device, the container being stored on the storage device, the system comprising:

means for determining the beginning and ending addresses of objects in the container;

means for selecting an object whose beginning and ending addresses have been determined to update;

means for loading the selected object from the container into the memory;

means for editing the loaded selected object;

means for moving the objects in the container after the selected object to a set of destination locations within the container, a first location within the set corresponding to the location of the beginning selected object;

means for expanding the container size; and means for writing the edited selected object from the memory to the container starting immediately after a last of the moved objects.

11. The system of claim 10 including means for truncating the container after the last of the moved objects before writing the edited selected object from the memory to the container.

12. The system of claim 10 wherein the container includes an object list containing a list of the objects stored in the container, the object list being located before the first object in the container and wherein the step of selecting an object to update includes the step of searching the list to determine if the selected object is stored in the container.

13. The system of claim 10 wherein each object has a size, the system further comprising means for determining the size of each object, and wherein the means for loading includes means for locating the selected object based on the sizes of the objects before the selected object.

14. A computer system for saving data, the computer system having a memory and a storage device, the storage device having a plurality of objects stored logically contiguously from a first address to a last address, each object containing data and having a starting address and an ending address, the system comprising:

means for selecting a target object stored on the storage device;

means for reading the target object into memory;

means for generating in memory an updated version of the target object;

means for determining the starting and ending addresses of the target object;

means for moving each object stored logically contiguously after the ending address of the target object to a new address so as to maintain logical contiguity of the objects thus moved and to at least partially overwrite the target object; and means for writing the updated version of the target object from the memory to the storage device with a starting address after the last address of a last one of the moved objects.

15. The system of claim 14 wherein each object has a size, the system further comprising means for determining the size of each object, and wherein the means for determining determines the starting address of the target object based on the sizes of the objects before the target object.

16. A method executed in a computer system for updating an object stored in a container, the container having a plurality of objects, the objects being ordered in the container from a first object to a last object, the computer system having a memory and a storage device, the container being stored on the storage device, the method comprising the steps of:

reading each object from the container into the memory;

selecting one of the objects in the memory to edit;

editing the selected object while the selected object is in memory;

moving each of the objects ordered in the container following the unedited selected object to a new location within the container; and after the step of moving, writing the edited selected object from the memory to the container by writing the edited selected object to a location after the new location within the container of the last ordered object of the moved objects, expanding the container size, when necessary, to contain the edited selected object.

* * * * *

UNITED STATES PATENT AND TRADEMARK OFFICE
CERTIFICATE OF CORRECTION

PATENT NO.    : 5,432,928
DATED         : July 11, 1995
INVENTOR(S)   : Andrew G. Sherman It is certified that error appears in the above identified patent and that said Letters Patent is hereby corrected as shown below:

In column 6, claim 10, line 29, after the first instance of "the" insert --beginning--.

In column 6, claim 10, line 29, after the second instance of "the" delete "beginning".

Signed and Sealed this

Fifth Day of December, 1995

Attest:

BRUCE LEHMAN

*Attesting Officer*    Commissioner of Patents and Trademarks